(12) United States Patent
Liang et al.

(10) Patent No.: US 10,303,734 B2
(45) Date of Patent: May 28, 2019

(54) METHOD, SYSTEM, AND DEVICE FOR MARKING WEB CONTENT

(71) Applicant: UC MOBILE LIMITED, Beijing (CN)

(72) Inventors: Jie Liang, Beijing (CN); Yongfu Yu, Beijing (CN); Xiaopeng He, Beijing (CN); Shunyan Zhu, Beijing (CN); Chunlin Chen, Beijing (CN)

(73) Assignee: UC MOBILE LIMITED, Beijing (CN)

( * ) Notice: Subject to any disclaimer, the term of this patent is extended or adjusted under 35 U.S.C. 154(b) by 94 days.

(21) Appl. No.: 14/440,862

(22) PCT Filed: Aug. 21, 2013

(86) PCT No.: PCT/CN2013/081998
§ 371 (c)(1),
(2) Date: May 5, 2015

(87) PCT Pub. No.: WO2014/075479
PCT Pub. Date: May 22, 2014

(65) Prior Publication Data
US 2015/0286743 A1      Oct. 8, 2015

(30) Foreign Application Priority Data

Nov. 14, 2012  (CN) .......................... 2012 1 0459049

(51) Int. Cl.
*G06F 17/00*      (2019.01)
*G06F 16/957*     (2019.01)
(Continued)

(52) U.S. Cl.
CPC ........ *G06F 16/9577* (2019.01); *G06F 16/957* (2019.01); *G06F 16/986* (2019.01); *G06F 17/2785* (2013.01)

(58) Field of Classification Search
CPC ......... G06F 17/30899; G06F 17/30905; G06F 17/30906; G06F 17/2785; G06F 17/30896;
(Continued)

(56) References Cited

U.S. PATENT DOCUMENTS 5,859,636 A *  1/1999  Pandit ................. G06F 17/2765
                                                  715/204
6,392,668 B1 *  5/2002  Murray ............. G06F 17/30893
                                                  705/14.1
(Continued)

FOREIGN PATENT DOCUMENTS

CN      101963973 A      2/2011
CN      102982129 A      3/2013
(Continued)

*Primary Examiner* — Cesar B Paula
*Assistant Examiner* — James H. Blackwell
(74) *Attorney, Agent, or Firm* — Alston & Bird LLP

(57) ABSTRACT

Techniques for performing marking and reminding on contents in a web page are disclosed. A browser client of a mobile terminal presets reminder content and a display style and stores the same in the mobile terminal. The method comprises: acquiring a source code of a web page; looking up the source code to obtain content to be reminded semantically associated with the preset reminder content; and marking and displaying the content to be reminded using the preset display style in the web page. The present invention marks content which concerns a user before a web page is displayed to the user after loading has finished, and marks and displays new content in a designated format using a special preset style, so that the new content is more conspicuous in a page.

19 Claims, 6 Drawing Sheets

(51) Int. Cl.
*G06F 16/958* (2019.01)
*G06F 17/27* (2006.01)

(58) Field of Classification Search
CPC .. G06F 16/9577; G06F 16/986; G06Q 10/109
See application file for complete search history.

(56) References Cited

U.S. PATENT DOCUMENTS

| | | | |
|---|---|---|---|
| 6,886,013 B1* | 4/2005 | Beranek | H04N 21/40 348/E5.002 |
| 7,711,550 B1* | 5/2010 | Feinberg | G06F 17/278 704/1 |
| 7,770,102 B1* | 8/2010 | Wolff | G06F 17/2785 715/234 |
| 2005/0060162 A1* | 3/2005 | Mohit | G06F 17/30855 705/1.1 |
| 2008/0065737 A1* | 3/2008 | Burke | G06F 17/30035 709/217 |
| 2008/0229290 A1* | 9/2008 | Jones | G06F 8/33 717/137 |
| 2010/0293180 A1* | 11/2010 | Vanderwende | G06F 17/30696 707/759 |
| 2013/0117677 A1* | 5/2013 | St. Jacques, Jr. | G06F 3/00 715/738 |

FOREIGN PATENT DOCUMENTS

| | | |
|---|---|---|
| JP | 2003/281141 A | 10/2003 |
| WO | WO 2001/059612 A2 | 8/2001 |

\* cited by examiner

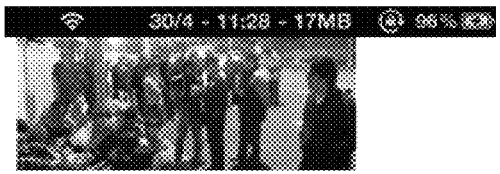

Officials responded to the forced demolitions in Taibei: update for a city

100 English tricks for career white-collar workers

Fantastic May 1    Test driving with a prize

[Domestic News]

[The latest] KuoMinTang "legislators: they should defend South China See sovereignty
Taiwan's reviews: It is possible to force Ma, Yingjiu to step down

[Today] Li, Keqiang will see Van Rompuy and Barroso
The tenth escort naval fleet docked in Hongkong
The governor visited the factory today

Figure 4a

Officials responded to the forced demolitions in Taibei: update for a city

100 English tricks for career white-collar workers

Fantastic May 1    Test driving with a prize

[Domestic News]

[The latest] KuoMinTang "legislators: they should defend South China See sovereignty
Taiwan's reviews: It is possible to force Ma, Yingjiu to step down

[Today] Li, Keqiang will see Van Rompuy and Barroso
The tenth escort naval fleet docked in Hongkong
The governor visited the factory today

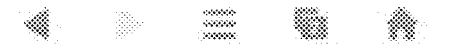

METHOD, SYSTEM, AND DEVICE FOR MARKING WEB CONTENT

CROSS-REFERENCE TO RELATED APPLICATION

This application is a U.S. National Stage of International Application No. PCT/CN2013/081998, filed Aug. 21, 2013, which claims the benefit of Chinese Patent Application No. 201210459049.4, filed Nov. 14, 2012, each of which is incorporated by reference herein.

FIELD

The present invention relates to the field of Internet technologies, particularly to a method and system for marking and reminding on contents in a web page, a browser client for a mobile terminal, and a server.

BACKGROUND

Internet users usually have their own frequently-visited sites, and users may visit the same site every day, so as to see the updated content, such as news or new posts and so on. If a page contains too much information, which lacks of a specific compelling style for displaying, the users cannot quickly figure out what are those updated contents. Instead, they need to slide down the page and view it slowly, which is more troublesome and time-consuming.

Although some sites use a self-defined special style to mark the new content, and distinguish the new content from the old content for the user-friendly viewing. There has been no uniform standard to mark up the new content. Thus, different websites mark new contents in different ways, which is still not so convenient for the users, and it will reduce the experience of the users.

BRIEF SUMMARY

The present invention is directed to one or more of the above-mentioned technical problems, or at least provides a useful commercial solution. To this end, the first object of the present invention is to provide a method to mark and remind on contents in a web page, wherein the method uses a browser client of a mobile terminal to mark and remind on the contents in the web page. This method not only saves the time of the users of the browser client of the mobile terminal, but also enhances the user experience. A second object of the present invention is to provide a system to mark and remind on contents in a web page. A third object of the present invention is to provide a browser client of a mobile terminal. A fourth object of the present invention is to provide a method to mark and remind on contents in a web page wherein the method uses a server to mark and remind on the contents in the web page. This method will not only save the time of the users of the browser client of the mobile terminal, but also enhance the user experience. A fifth object of the present invention is to provide a system for marking and reminding on contents in a web page. A sixth object of the present invention is to provide a server.

To achieve the above objects, an embodiment of the first aspect of the present invention provides a method of marking and reminding on contents in a web page, a browser client of a mobile terminal presetting reminder content and a display style, and storing the reminder content and the display style in the mobile terminal, the method comprising the steps of: acquiring, by the browser client of the mobile terminal, a source code of a web page; looking up, by the browser client of the mobile terminal, the source code to obtain the content to be reminded semantically associated with preset reminder content; and marking and displaying, by the browser client of the mobile terminal, the content to be reminded using a preset display style.

According to the method of performing marking and reminding on contents in a web page in the present invention, the browser client of the mobile terminal marks content which concerns a user before a web page is displayed to the user after loading has finished, and marks and displays a new content in a designated format using a special preset style, so that the new content is more conspicuous in a page, and a user can conveniently and rapidly identify the new content when browsing a web page, thereby enhancing the user experience and saving time.

An embodiment of the second aspect of the present invention provides a system for marking and reminding on contents in a web page, comprising: a browser client of a mobile terminal, configured to preset reminder content and a display style; store the reminder content and the display style in the mobile terminal; acquire a source code of the web page; look up the source code to obtain content to be reminded semantically associated with preset reminder content; and mark and display the content to be reminded using a preset display style in the web page; and a server, configured to receive a request of the browser to visit the web page and send the web page to the browser in response to the request.

According to the system of performing marking and reminding on contents in a web page, the browser client of the mobile terminal marks a content which concerns a user before a web page is displayed to the user after loading has finished, and marks and displays a new content in a designated format using a special preset style, so that the new content is more conspicuous in a page, and a user can conveniently and rapidly identify the new content when browsing a web page, thereby enhancing the user experience and saving time.

An embodiment of the third aspect of the present invention provides a browser client of a mobile terminal, comprising: a preset module, configured to preset reminder content and a display style, and store the reminder content and the display style in a mobile terminal; a source code acquiring module, configured to acquire a source code of a web page; a query module, configured to look up the source code to obtain content to be reminded semantically associated with preset reminder content; a marking module, configured to mark and display content to be reminded using a preset display style in the web page; and a display module, configured to display the marked content to be reminded.

According to the browser client of the mobile terminal in the present invention, the browser client of the mobile terminal marks content which concerns a user before a web page is displayed to the user after loading has finished, and marks and displays a new content in a designated format using a special preset style, so that the new content is more conspicuous in a page, and a user can conveniently and rapidly identify the new content when browsing a web page, thereby enhancing the user experience and saving time.

The fourth aspect of the present invention provides a method for performing marking and reminding on contents in a web page wherein a server presets reminder content and a display style and stores the reminder content and the display style in the mobile terminal and wherein the method comprises the server configured to: acquire a source code of the web page; look up the source code to obtain content to be reminded semantically associated with preset reminder content; mark and display the content to be reminded using a preset display style in the web page; and send the marked web page to the browser client of the mobile terminal.

According to the method of performing marking and reminding on contents in a web page in the present invention, the server marks a content which concerns a user before a web page is displayed to the user after loading has finished, and marks and displays a new content in a designated format using a special preset style, so that the new content is more conspicuous in a page, and a user can conveniently and rapidly identify the new content when browsing a web page, thereby enhancing the user experience and saving time.

The fifth aspect of the present invention provides a system for marking and reminding on contents in a web page, comprising: a browser client of a mobile terminal, configured to be a web page after it receives the mark; a server, configured to preset and store reminder content and a display style, wherein the server is configured to: acquire a source code of the web page, look up the source code to obtain content to be reminded semantically associated with preset reminder content, mark and display the content to be reminded using a preset display style in the web page, and send the marked web page to the browser client of the mobile terminal.

According to the system of performing marking and reminding on contents in a web page in the present invention, the server marks a content which concerns a user before a web page is displayed to the user after loading has finished, and marks and displays a new content in a designated format using a special preset style, so that the new content is more conspicuous in a page, and a user can conveniently and rapidly identify the new content when browsing a web page, thereby enhancing the user experience and saving time.

The sixth aspect of the present invention provides a server, comprising: a preset module, configured to preset and store reminder content and a display style; a source code acquiring module, configured to acquire source code of a web page; a query module, configured to look up the source code to obtain content to be reminded semantically associated with preset reminder content; a marking module, configured to mark and display content to be reminded using a preset display style in the web page; and a communication module, configured to send the marked web page to a browser client of a mobile terminal.

According to the server in the present invention, the server marks a content which concerns a user before a web page is displayed to the user after loading has finished and it is sent to a browser client of a mobile terminal, and marks and displays a new content in a designated format using a special preset style, so that the new content is more conspicuous in a page, and a user can conveniently and rapidly identify the new content when browsing a web page, thereby enhancing the user experience and saving time.

Additional aspects and advantages of the invention will be given in part in the following description. Various aspects of the invention will become apparent from the following description, or learned from practicing in accordance with the following description.

BRIEF DESCRIPTION OF THE DRAWINGS

Additional aspects and advantages of the invention will be described in the connection with the following drawings of embodiments, wherein:

FIG. 4a is a schematic view of a web page before a keyword is marked according to some embodiments;

FIG. 4b is a schematic view of a web page after a keyword is marked according to some embodiments;

DETAILED DESCRIPTION

Figure 1:
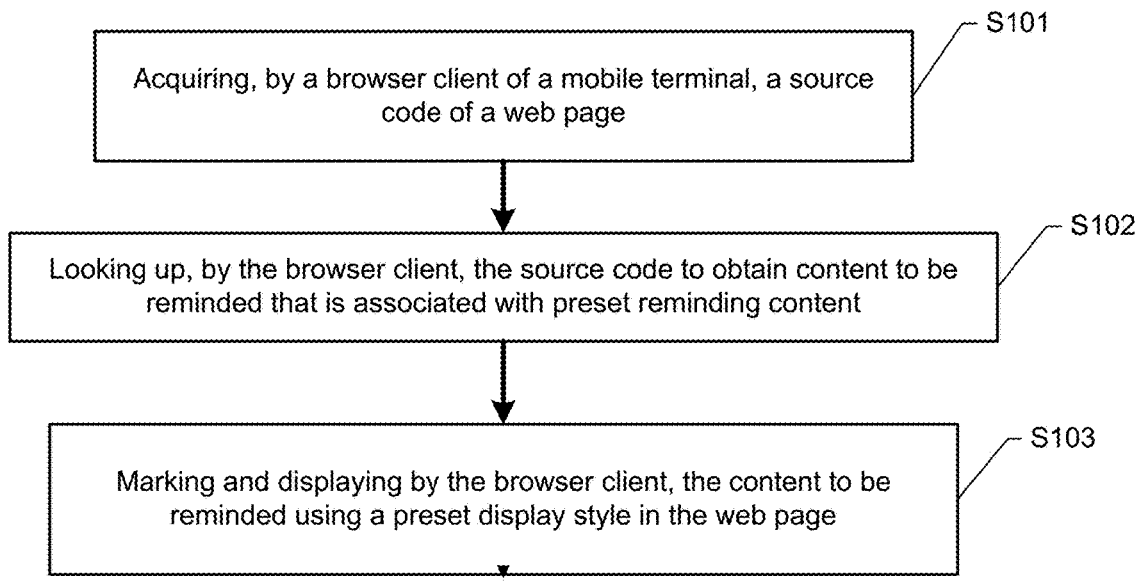
FIG. 1 is a schematic flow diagram of a method for marking and reminding on contents in a web page according to some embodiments.

Some embodiments of the present invention will be described in detail below, and the examples of the embodiments in the accompanying drawings show that, the same or similar marks indicate the same or similar elements, or elements having the same or similar functions. The following embodiments with reference to the accompanying drawings are exemplary and are intended to illustrate the invention, but should not be construed as limiting the present invention.

In addition, the terms "first", "second" are only used to describe the object, but should not be understood to indicate or imply relative importance or the number of implicitly specified technical features. Thus, defining the "first", "second" features may explicitly or implicitly includes one or more of the characteristics.

In the description of the present invention, a "plurality" means two or more, unless otherwise expressly specified. In the present invention, unless otherwise expressly specified and defined, the terms "mounted," "connected", "connecting", "fixed" and other terms are to be broadly understood, for example, it may be a fixed connection, or a detachable connection, or integrally connected; may be a mechanical connection, or may be electrically connected; may be directly connected, or may be connected indirectly through an intermediary, may be internal communication within two elements. To those of ordinary skill in the art, the term can be understood in the context of the present invention depending on the circumstances.

The following FIGS. 1 to 4 describe a method for marking and reminding on contents in a web page according to some embodiments. A browser client of a mobile terminal presets reminder content and a display style, and stores the reminder content and the display style in the mobile terminal.

The preset reminder content is the content in a web page which concerns a user of a browser client of a mobile terminal and can be preset by the user in the browser client of the mobile terminal and stored as a file in the mobile terminal.

In the example of the present invention, the preset reminder content can be classified into dates and non-dates.

Specifically, the preset reminder content may include the date and/or keywords. Further, based on the content type, the preset reminder content is stored in a predetermined format. Specifically, the date is stored in a designated date format, for example: yyyy-mm-dd, yy-mm-dd or mm-dd. Non-date information may be stored in a designated keyword format, for example: [latest], [new], [today], [headlines], and so on.

The body of the web page may contain a date and/or a text, but the content may not be of interest to the user. By the above-described manner of setting the date and/or keyword format, interference with other non-date and/or keywords in a web page which are of no interest to users is avoided.

It should be understood that the above is merely an example of the preset reminder content, and not to limit the present invention. The preset reminder content in the present invention may further include those other than dates and keywords that a user of a browser client of a mobile terminal is concerned about.

After the browser client of the mobile terminal starts browsing, the browser client of the mobile terminal automatically obtains the date of the current system through the interface prompted from the system, and converts the date to all kinds of date strings consistent with the date format in the preset reminder content, and stores converted date strings and keywords.

Under the circumstance of presetting and storing reminder content and a display style by the browser client of the mobile terminal, as shown in FIG. 1, a method for marking and reminding on contents in a web page in the embodiment of the present invention comprises the following steps:

Step S101, the browser client of the mobile terminal acquires a source code of a web page.

The user of the browser client of the mobile terminal inputs a desired webpage address in the mobile terminal, and the browser client of the mobile terminal sends a request of accessing the webpage to the server based on the address. The server sends the content of the web page to the browser client of the mobile terminal in response to the request and the browser client of the mobile terminal obtains the web page that is the web page requested by the user of the browser client of the mobile terminal. The browser client may execute on any suitable mobile terminal, such as mobile phones, tablet computers, desktop computers and other devices with web browsing capabilities. The browser client of the mobile terminal obtains the source code of the web page. The the source code of the web page may be in a html format.

Step S102, the browser client of the mobile terminal looks up the source code to obtain the content to be reminded that is semantically associated with preset reminder content.

In the process of loading web pages, the browser client of the mobile terminal automatically looks up the source code from the step S101 and obtains the content to be reminded semantically associated with preset reminder content. It is noted that "associated" may include the concept of the same, equivalent, similar.

In one embodiment of the present invention, the browser client of the mobile terminal makes segmentation and semantic analysis on the content of the source code to generate semantic analysis results. Then the browser client of the mobile terminal compares the preset reminder content to the semantic analysis results. The browser client of the mobile terminal defines the content of the source code corresponding to the part of the semantic analysis results to be reminded, if at least part of the semantic analysis results is associated with the preset reminder content.

Specifically, the browser client of the mobile terminal compares the source code with preset reminder content and determines whether they are related, and sets the related content as the content to be reminded. The content to be reminded semantically associated with preset reminder content comprising: the same content as the preset reminder content or the content having the same meaning as the preset reminder content.

Example (1) the same semantic content
preset reminder content: 2012-06-23
the source content: 2012-06-23

The browser client of the mobile terminal compares the source code with a preset reminder content, and it can find "2012-06-23" in the source code is exactly the same as "2012-06-23" in the preset reminder content, thus it is determined that "2012-06-23" in the source code is the content to be reminded.

Example (2) the equivalent semantic content
preset reminder content: Today
the source content: Today is sunny The browser client of the mobile terminal makes segmentation on the content of the source code, for example: Today the weather is sunny. Then it makes semantic analyses of the above words "Today", "weather", "sunny" to obtain the semantic analysis result of each word. Then these semantic analysis results are compared with the preset reminder content, and it is determined that "Today" in the source is semantically the same as "Today" in the preset reminder content. Thus "today" in the source code is the content to be reminded.

Example (3) the similar semantic content
preset reminder content: Video
the source content: the latest movie release The browser client of the mobile terminal makes segmentation on the content in the source code, such as: the latest movie release. Then it makes semantic analysis of the above words "latest," "movie," and "release," respectively, and obtains the semantic analysis results of each word. Then the semantic analysis results are compared with the preset reminder content, and it is determined that "movie" in the source code is semantically similar to "video" in preset reminder content. Thus it is determined that "movie" in the source code is the content to be reminded.

Step S103, the browser client of the mobile terminal mark and display the content to be reminded in a web page content using a preset display style.

After the browser client of the mobile terminal obtains the content to be reminded, it clears the default format of the content to be reminded, a page code control format and sets the content to be reminded using a preset display style. Wherein the default style corresponds to one or more of the default attributes. The preset display style corresponds to one or more preset attribute values.

Specifically, the browser client of mobile terminal obtains from the source code the initial attribute value with one or more of the preset attributes. In other words, the browser client of the mobile terminal obtains the initial default style of the content to be reminded, then modifies the initial attribute value with one or more of the preset attributes into preset attribute values and generates the marked web page after the modification.

In one example of the present invention, the preset attributes include one or more of font weight, font color, underline, background color.

Figure 2A:
FIG. 2a is a schematic view of a web page before a date is marked according to some embodiments.
Figure 2B:
FIG. 2b is a schematic view of a web page after a date is marked according to some embodiments.

Referring to FIGS. 2a and 2b they describe the process of marking dates. Wherein the current date is set for Apr. 30, 2012. The content to be reminded is the current date.

FIG. 2a shows the web page before the date is marked, and FIG. 2b shows the web page after the date is marked. It is seen from FIG. 2a that the contents of a web page include a plurality of dates, e.g. 2012-2-25, 2011-10-27 and 2012-4-30. Feb. 25, 2012, Oct. 27, 2011 and Apr. 30, 2012. Before the date is marked, the current date 2012-4-30 show consistent results with other dates without a distinction. In order to mark the content to be reminded, the browser client of the mobile terminal marks the content to be reminded in the web page. Specifically, as shown in FIG. 2b, the browser client of the mobile terminal makes "2012-4-30" in the web page in bold and underlined. It is understood that the mode of the browser client of the mobile terminal marking the content to be reminded is not limited thereto, but also can be in other ways. For example, it can change the font color of the content to be reminded, or make the font of the content to be reminded italic. Further, the above-described manner may be used singly and in combination.

In one embodiment of the present invention, when the content to be reminded is a date, the browser client of the mobile terminal only marks the dates first appearing in each paragraph or each line in the web page.

Figure 3:
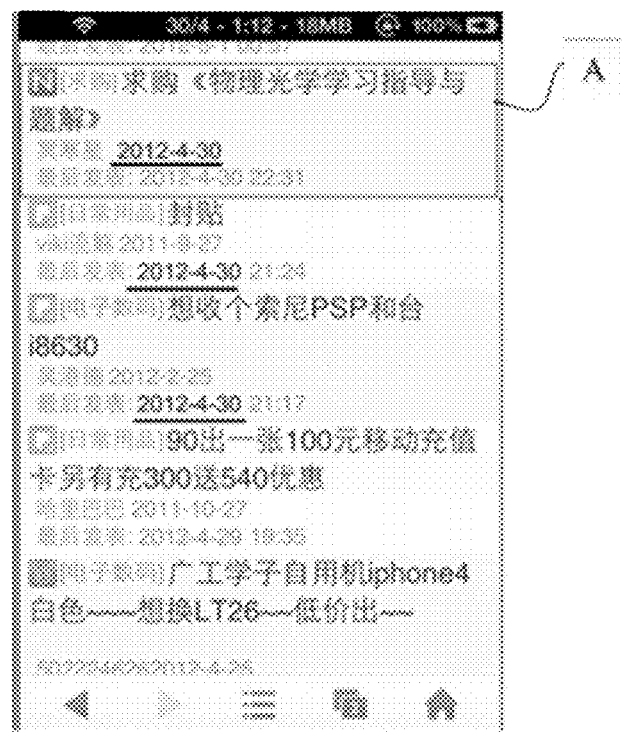
FIG. 3 is a schematic view of a mark with the same contents according to some embodiments.

As shown in FIG. 3, there are two instances of the date "2012-4-30" within a form A of a web page. To avoid marking excessively and affecting the user's view, the content to be reminded first appearing is marked. As can be seen from FIG. 3, the browser client of the mobile terminal only marks "2012-4-30" that appears for the first time within the form A, while "2012-4-30" appearing in the next line for the second time is not marked.

FIGS. 4a and 4b describe the process of marking keywords. In this example, the content to be reminded is "Today" and "the latest."

FIG. 4a shows a web page before a keyword is marked, FIG. 4b shows a web page after a keyword is marked. As can be seen from the figure, the web page includes a plurality of words, some of which are isolated, for example: "[domestic concern]", "[the latest]," "[Today]." Some are located within a sentence, for example: "career" in "100 essential English tricks for career white-collar workers." The keywords "Today" and "the latest" before they are marked show consistent results without other keywords without a distinction. In order to mark the content to be reminded, the browser client of the mobile terminal marks the content to be reminded in the web page. Specifically, as shown in FIG. 4b, the browser client of the mobile terminal underlines, "[the latest]," and "[Today]" in the web page. It is understood that the mode of the browser client of the mobile terminal marking the content to be reminded is not limited thereto, but also can be in other ways. For example, it can change the font color of the content to be reminded, or make the font of the content to be reminded italic. Further, the above-described manner may be used singly and in combination.

In order to avoid the interference caused to the user, when the content to be reminded is a keyword, the browser client of the mobile terminal only marks isolated keywords. Specifically, the browser client of the mobile terminal only marks a special format in which there are no English or Chinese characters before and after, such as "the latest" and "Today" in FIG. 4a. If the web page content includes "the governor visited the factory today," because "Today" is located in the sentence, not isolated, so it is not marked.

It should be noted that, whether a keyword in a sentence matches the preset reminder content can be set by the user according to their habits.

After the content to be reminded in the web page is marked, the marked page is sent and displayed to the user of the browser client of the mobile terminal The marked page conspicuously displays the content that concerns a user so that users can more easily find and view the contents they care about.

According to the method for marking and reminding on contents in a web page in the present invention, the browser client of the mobile terminal marks a content which concerns a user before a web page is displayed to the user after loading has finished, and marks and displays a new content in a designated format using a special preset style, so that the new content is more conspicuous in a page, and a user can conveniently and rapidly identify the new content when browsing a web page, thereby enhancing the user experience and saving time.

Figure 5:
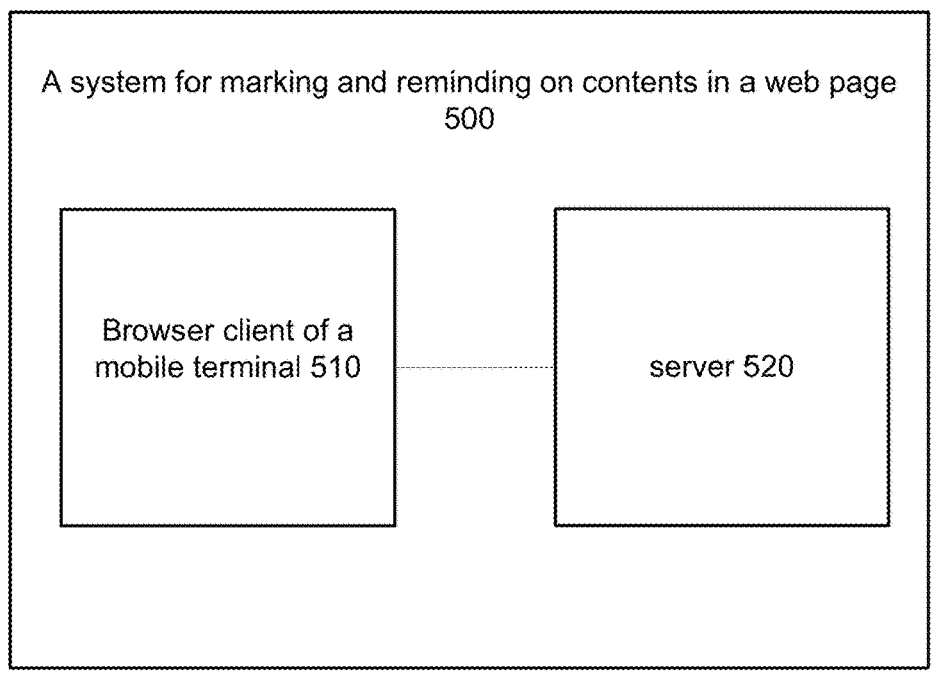
FIG. 5 is a schematic view of a system for marking and reminding on contents in a web page according to some embodiments.

FIG. 5 shows a system for marking and reminding on contents in a web page 500 according to some embodiments.

As shown in FIG. 5, the system for marking and reminding on contents in a web page 500 may include: a browser client of a mobile terminal 510 and a server 520.

The browser client of the mobile terminal 510 is configured to: preset reminder content and a display style; store the reminder content and the display style in the mobile terminal; and obtain the source code of a web page. Specifically, the the preset reminder content is the web page content that concerns a user of the browser client of the mobile terminal, which may be preset in the browser client of the mobile terminal by the user and stored in a file format in the mobile terminal.

In the embodiment of the present invention, the preset reminder content can be classified into the preset dates and non-dates. Specifically, the preset reminder content may include the date and/or keywords. Further, the preset reminder content is stored in a predetermined format based on the content type.

Specifically, the date may be stored in a designated date format, for example: yyyy-mm-dd, yy-mm-dd or mm-dd. Non-date is stored in a designated keyword format, for example: [latest], [new], [today], [headlines] and so on.

The body of the web page contains a date and/or a text, but the content may not be of interest to the user. By the above-described manner to set the date and/or keyword format, thereby avoiding the interference of other non-date and/or keywords in a web page which are of no interest to users.

It should be understood that the above is merely an example of the preset reminder content, and not to limit the present invention. The preset reminder content in the present invention may further include those other than dates and keywords that a user of a browser client of a mobile terminal is concerned about.

After the browser client of the mobile terminal 510 starts browsing, the browser client of the mobile terminal automatically obtains the date of the current system through the interface prompted from the system, and converts the date to all kinds of date strings consistent with the date format in the preset reminder content, and stores converted date strings and keywords.

The user of the browser client of the mobile terminal 510 inputs a desired webpage address in the mobile terminal, and the browser client of the mobile terminal 510 sends a request of accessing the webpage to the server 520 based on the address. The browser client of the mobile terminal receives the web page returned by the server 520 and acquires the source code of the web page wherein the source code of the web page is in a html format.

In the example of the present invention, the browser client of the mobile terminal 510 can be mobile phones, tablet computers, desktop computers and other devices having web browsing capabilities.

In the process of loading web pages, the browser client of the mobile terminal 510 automatically looks up the source code to obtain the content to be reminded semantically associated with preset reminder content. The content to be reminded associated with preset reminder content may include: the same content as the preset reminder content or the content having the same meaning as the preset reminder. It is noted that "associated" may include the concept of the same, equivalent, similar.

In one embodiment of the present invention, the browser client of the mobile terminal 510 makes segmentation and semantic analysis on the content of the source code to generate semantic analysis results. Then the browser client of the mobile terminal compares the preset reminder content to the semantic analysis results. It defines the content of the source code corresponding to the part of the semantic analysis results to be reminded, if at least part of the semantic analysis results is associated with the preset reminder content Specifically, the browser client of the mobile terminal 510 compares the source code with preset reminder content and determines whether they are related and sets the related content as the content to be reminded.

After the browser client of the mobile terminal 510 obtains the content to be reminded, it clears the default format of the content to be reminded, a page code control format and sets the content to be reminded using a preset display style. Wherein the default style corresponds to one or more of the default attributes. The preset display style corresponds to one or more preset attribute values Specifically, the browser client of mobile terminal 510 may be configured to obtain from the source code the initial attribute value with one or more of the preset attributes. In other words, the browser client of the mobile terminal 510 obtains the initial default style of the content to be reminded, then modifies the initial attribute value with one or more of the preset attributes into preset attribute values and generates the marked web page after the modification.

In one example of the present invention, the preset attributes include one or more of font weight, font color, underline, background color.

In one embodiment of the present invention, when the content to be reminded is a date, the browser client of the mobile terminal only marks the dates first appearing in each paragraph or each line in the web page.

In order to avoid the interference caused to the user, when the content to be reminded is a keyword, the browser client of the mobile terminal 510 only marks isolated keywords. Specifically, the browser client of the mobile terminal 510 only marks a special format in which there are no English or Chinese characters before and after.

After the content to be reminded in the web page is marked, the marked page is sent and displayed to the user of the browser client of the mobile terminal. The marked page conspicuously displays the content that concerns a user so that users can more easily find and view the contents they care about.

According to the system for marking and reminding on contents in a web page in the present invention, the browser client of the mobile terminal marks a content which concerns a user before a web page is displayed to the user after loading has finished, and marks and displays a new content in a designated format using a special preset style, so that the new content is more conspicuous in a page, and a user can conveniently and rapidly identify the new content when browsing a web page, thereby enhancing the user experience and saving time.

Figure 6:
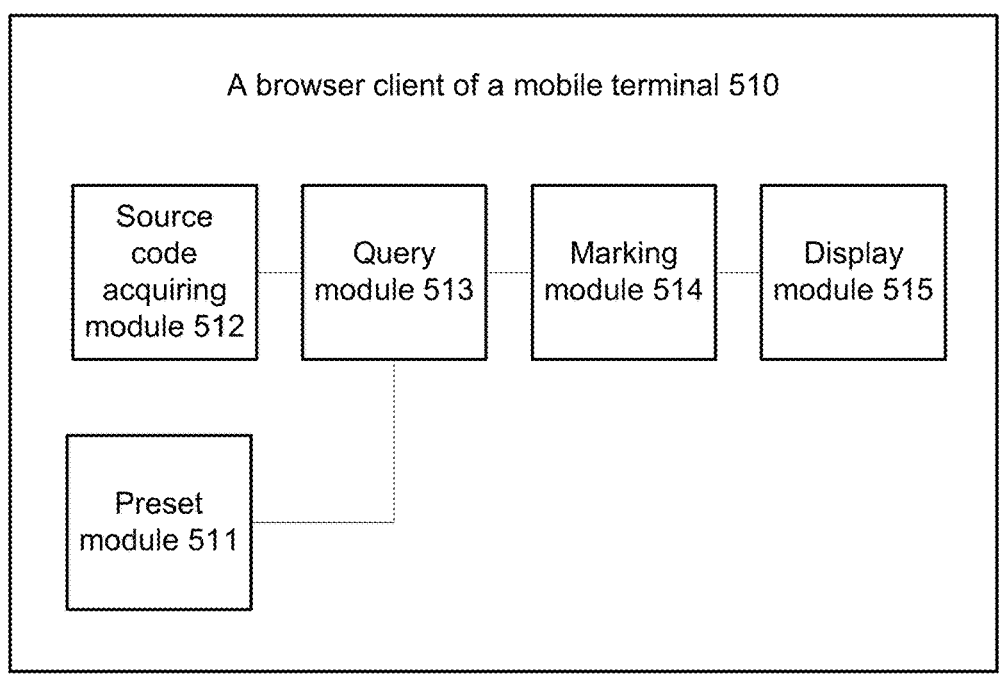
FIG. 6 is a schematic view of a browser client of a mobile terminal according to some embodiments.

FIG. 6 describes a browser client of a mobile terminal 510 according to some embodiments.

As shown in FIG. 6, the browser client of the mobile terminal 510 may include: a preset module 511, a source code acquiring module 512, a query module 513, a marking module 514, and a display module 515. The browser client may be implemented on the mobile terminal 510, which may be a mobile phone, tablet computer, desktop computer or other device with web browsing capabilities. The preset module 511 is set to preset reminder content and a display style, and store same in a mobile terminal. The preset reminder content is the web page content that concerns a user of the browser client of the mobile terminal, which may be preset in the browser client of the mobile terminal by the user and stored in a file format in the mobile terminal.

In the example of the present invention, the preset reminder content can be classified into dates and non-dates. Specifically, the preset reminder content may include the date and/or keywords. Further, based on the content type, the preset reminder content is stored in a predetermined format.

Specifically, the date is stored in a designated date format, for example: yyyy-mm-dd, yy-mm-dd or mm-dd. Non-date is stored in a designated keyword format, for example: [latest], [new], [today], [headlines] and so on.

The body of the web page contains a date and/or a text, but the content may not be of interest to the user. By the above-described manner to set the date and/or keyword format, thereby avoiding the interference of other non-date and/or keywords in a web page which are of no interest to users It should be understood that the above is merely an example of the preset reminder content, and not to limit the present invention. The preset reminder content in the present invention may further include those other than dates and keywords that a user of a browser client of a mobile terminal is concerned about.

A source code acquiring module 512 is set to acquire a source code of a web page Specifically, the user of the browser client of the mobile terminal 510 inputs a desired webpage address in the mobile terminal, and the source code acquiring module 512 sends a request of accessing the webpage to the server. The module 512 receives the web page returned by the server and acquires the source code of the web page wherein the source code of the web page is in a html format.

In the process of loading web pages, the query module 513 automatically looks up the source code to obtain the content to be reminded semantically associated with preset reminder content. It is noted that "associated" may include the concept of the same, equivalent, similar. In one embodiment of the present invention, the query module 513 makes segmentation and semantic analysis on the content of the source code to generate semantic analysis results. Then the query module 513 compares the preset reminder content to the semantic analysis results. It defines the content of the source code corresponding to the part of the semantic analysis results to be reminded, if at least part of the semantic analysis results is associated with the preset reminder content.

Specifically, the query module 513 compares the source code with preset reminder content and determines whether they are related and sets the related content as the content to be reminded. Wherein, the content to be reminded semantically associated with preset reminder content comprising: the same content as the preset reminder content or the content having the same meaning as the preset reminder content. After the query module 513 obtains the content to be reminded, it clears the default format of the content to be reminded, a page code control format and sets the content to be reminded using a preset display style. Wherein the default style corresponds to one or more of the default attributes. The preset display style corresponds to one or more preset attribute values.

Specifically, the marking module 514 obtains from the source code the initial attribute value with one or more of the preset attributes. In other words, the marking module 514 obtains the initial default style of the content to be reminded, then modifies the initial attribute value with one or more of the preset attributes into preset attribute values and generates the marked web page after the modification.

In one example of the present invention, the preset attributes include one or more of font weight, font color, underline, background color.

In one embodiment of the present invention, when the content to be reminded is a date, the marking module 514 only marks the dates first appearing in each paragraph or each line in the web page.

In order to avoid the interference caused to the user, when the content to be reminded is a keyword, the marking module 514 only marks isolated keywords. Specifically, the marking module 514 only marks a special format in which there are no English or Chinese characters before and after.

After the content to be reminded in the web page is marked, the marking module 514 generates the marked web page. The display module 515 displays the marked content to be reminder by the marking module 514. Specifically, the display module 515 displays the marked content to be reminded to the user of the browser client of the mobile terminal 510 so that so that users can more easily find and view the content they care about.

According to the browser client of the mobile terminal in the present invention, the browser client of the mobile terminal marks a content which concerns a user before a web page is displayed to the user after loading has finished, and marks and displays a new content in a designated format using a special preset style, so that the new content is more conspicuous in a page, and a user can conveniently and rapidly identify the new content when browsing a web page, thereby enhancing the user experience and saving time.

Figure 7:
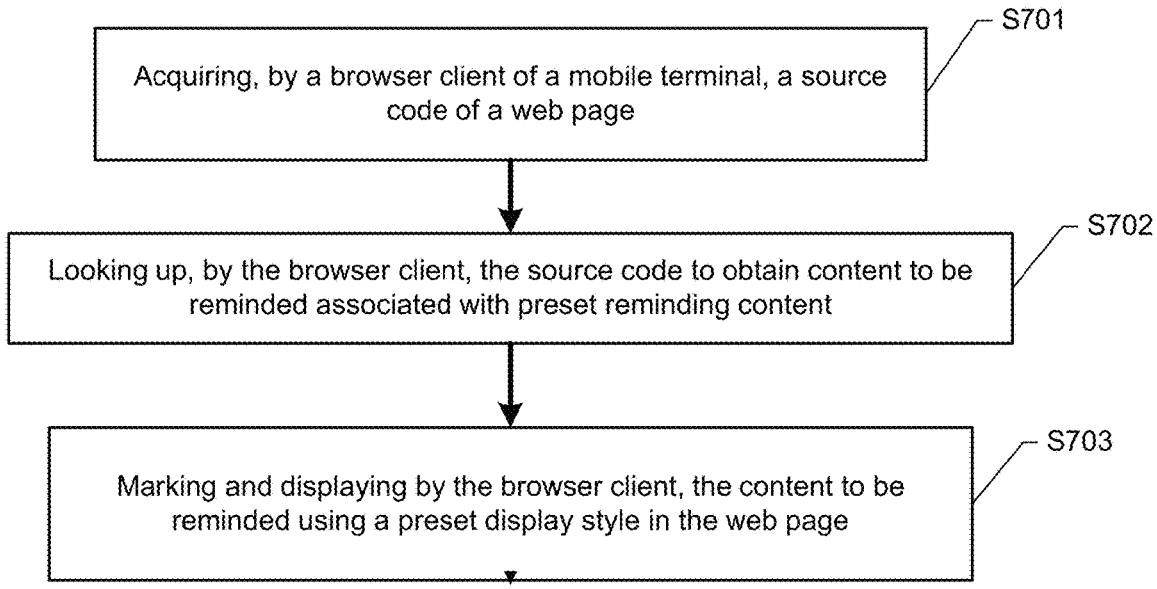
FIG. 7 is a schematic flow diagram of a method for marking and reminding on contents in a web page according to some embodiments.

FIG. 7 describes a method for marking and reminding on contents in a web page according to an embodiment of the present invention. A server presets reminder content and a display style, and stores same in the mobile terminal.

The preset reminder content is the web page content that concerns a user of the browser client of the mobile terminal, which may be preset in the browser client of the mobile terminal by the user and sent to the server.

In the example of the present invention, the preset reminder content can be classified into dates and non-dates. Specifically, the preset reminder content may include the date and/or keywords. Further, based on the content type, the preset reminder content is stored in a predetermined format.

Specifically, the date is stored in a designated date format, for example: yyyy-mm-dd, yy-mm-dd or mm-dd. Non-date is stored in a designated keyword format, for example: [latest], [new], [today], [headlines] and so on.

The body of the web page contains a date and/or a text, but the content may not be of interest to the user. By the above-described manner to set the date and/or keyword format, thereby avoiding the interference of other non-date and/or keywords in a web page which are of no interest to users.

It should be understood that the above is merely an example of the preset reminder content, and not to limit the present invention. The preset reminder content in the present invention may further include those other than dates and keywords that a user of a browser client of a mobile terminal is concerned about.

The server automatically obtains the date of the current system through the interface prompted from the system, and converts the date to all kinds of date strings consistent with the date format in the preset reminder content, and stores converted date strings and keywords.

The server further receives preset reminder content set by the user of the browser client of the mobile terminal. For example, the browser client of the mobile terminal has a user interface, the user sets preset reminder content through this interface, and the browser client of the mobile terminal sends it to the server.

Under the circumstance of presetting and storing reminder content by the server as described above, as in FIG. 7, the method for marking and reminding on contents in a web page may include the following steps:

Step S701, the server acquires a source code of a web page.

The server receives a request of accessing a web page by the browser client of the mobile terminal. Specifically, the user of the browser client of the mobile terminal inputs a desired webpage address in the mobile terminal, and the browser client of the mobile terminal sends a request of accessing the webpage to the server. The server receives the request of accessing the web page sent by the browser client of the mobile terminal. The browser client of the mobile terminals can be implemented on mobile phones, tablet computers, desktop computers and other devices with web browsing capabilities.

The server responds to the request sent by the browser client of the mobile terminal and obtains the corresponding pages and the source code of the web pages in a html format.

Step S702, the server looks up the content to be reminded semantically associated with preset reminder content.

In the process of loading web pages, the server automatically looks up the source code to obtain the content to be reminded semantically associated with preset reminder content. It is noted that "associated" may include the concept of the same, equivalent, similar.

In one embodiment of the present invention, the server makes segmentation and semantic analysis on the content of the source code to generate semantic analysis results. Then the server compares the preset reminder content to the semantic analysis results. The server defines the content of the source code corresponding to the part of the semantic analysis results to be reminded, if at least part of the semantic analysis results is associated with the preset reminder content.

Specifically, the server compares the source code with preset reminder content and determines whether they are related and sets the related content as the content to be reminded. Wherein, the content to be reminded semantically associated with preset reminder content comprising: the same content as the preset reminder content or the content having the same meaning as the preset reminder content.

Example (1) the same semantic content
the preset reminder content: 2012-06-23
the source code content: 2012-06-23

The server compares the source code with a preset reminder content, and it can find "2012-06-23" in the source code is exactly the same as "2012-06-23" in the preset reminder content, thus it is determined that "2012-06-23" in the source code is the content to be reminded Example (2) the equivalent semantic content
the preset reminder content: Today
the source code content today: Today the weather is sunny The server makes segmentation on the content of the source code, for example: Today the weather is sunny. Then it makes semantic analyses of the above words "Today," "weather," "sunny" to obtain the semantic analysis result of each word. Then these semantic analysis results are compared with the preset reminder content, and it is determined that "Today" in the source is semantically the same as "Today" in the preset reminder content. Thus "today" in the source code is the content to be reminded.

Example (3) the similar semantic content
the preset reminder content: Video
the source code content: the latest movie release The server makes segmentation on the content in the source code, such as: the latest movie release. Then it makes semantic analysis of the above words "latest," "movie," "release," respectively, and obtains the semantic analysis results of each word. Then the semantic analysis results are compared with the preset reminder content, and it is determined that "movie" in the source code is semantically similar to "video" in preset reminder content. Thus it is determined that "movie" in the source code is the content to be reminded.

Step S703, the server marks the content to be reminded in the web page in a preset display style and sends the marked web page to the browser client of the mobile terminal.

After server obtains the content to be reminded, it clears the default format of the content to be reminded, a page code control format and sets the content to be reminded using a preset display style. The default style corresponds to one or more of the default attributes. The preset display style corresponds to one or more preset attribute values.

Specifically, the server obtains from the source code the initial attribute value with one or more of the preset attributes. In other words, the server obtains the initial default style of the content to be reminded, then modifies the initial attribute value with one or more of the preset attributes into preset attribute values and generates the marked web page after the modification.

In one example of the present invention, the preset attributes include one or more of font weight, font color, underline, background color.

When the content to be reminded is a date, the server only marks the dates first appearing in each paragraph or each line in the web page.

In order to avoid the interference caused to the user, when the content to be reminded is a keyword, the server only marks isolated keywords. Specifically, the server only marks a special format in which there are no English or Chinese characters before and after.

After marking the content to be reminded in the web page, the marked page is sent and displayed to the user of the browser client of the mobile terminal. The marked page conspicuously displays the content that concerns a user so that the user can more easily find and view the contents of their own care.

According to the method for marking and reminding on contents in a web page in the present invention, the server marks a content which concerns a user before a web page is displayed to the user after loading has finished and the webpage is sent to the browser client of the mobile terminal, and marks and displays a new content in a designated format using a special preset style, so that the new content is more conspicuous in a page, and a user can conveniently and rapidly identify the new content when browsing a web page, thereby enhancing the user experience and saving time.

Figure 8:
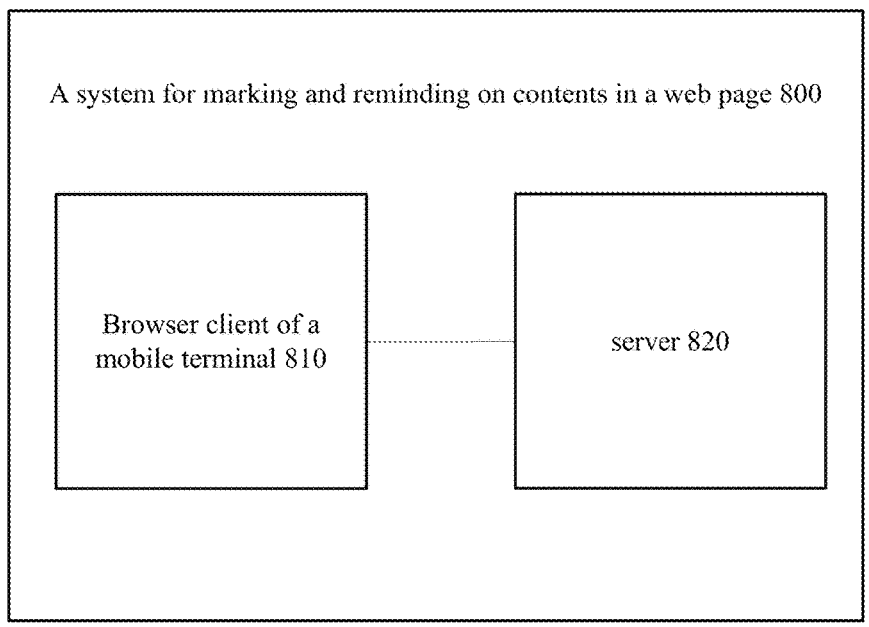
FIG. 8 is a schematic view of a system for marking and reminding on contents in a web page according to some embodiments.

FIG. 8 describes a system for marking and reminding on contents in a web page 800 according to some embodiments.

As in FIG. 8, the system for marking and reminding on contents in a web page 800 in the present invention comprises a browser client of a mobile terminal 810 and a server 820. The browser client of the mobile terminal 810 can be mobile phones, tablet computers, desktop computers and other devices with web browsing capabilities.

The user of the browser client of the mobile terminal 810 inputs a desired webpage address in the mobile terminal, and the browser client of the mobile terminal 810 sends a request of accessing the webpage to the server 820 based on the address. The server 820 receives the request of accessing the web page sent by the browser client of the mobile terminal 810.

The server 820 presets and stores reminder content and a display style.

The preset reminder content is the content in a web page which concerns a user of a browser client of a mobile terminal 810 and can be preset and sent to the server 820 by the user in the browser client of the mobile terminal 810.

In the example of the present invention, the preset reminder content can be classified into the preset dates and non-dates. Specifically, the preset reminder content may include the date and/or keywords. Further, the preset reminder content is stored in a predetermined format based on the content type.

Specifically, the date is stored in a designated date format, for example: yyyy-mm-dd, yy-mm-dd or mm-dd. Non-date is stored in a designated keyword format, for example: [latest], [new], [today], [headlines] and so on.

The body of the web page contains a date and/or a text, but the content may not be of interest to the user. By the above-described manner to set the date and/or keyword format, thereby avoiding the interference of other non-date and/or keywords in a web page which are of no interest to users.

It should be understood that the above is merely an example of the preset reminder content, and not to limit the present invention. The preset reminder content in the present invention may further include those other than dates and keywords that a user of a browser client of a mobile terminal is concerned about.

The server 820 automatically obtains the date of the current system through the interface prompted from the system, and converts the date to all kinds of date strings consistent with the date format in the preset reminder content, and stores converted date strings and keywords.

The Server 820 responds to the request sent by the browser client of the mobile terminal and obtains the corresponding pages and the source code of the web pages in html.

In the process of loading web pages, the server 820 automatically looks up the source code to obtain the content to be reminded semantically associated with preset reminder content. Wherein the content to be reminded associated with preset reminder content comprises: the same content as the preset reminder content or the content having the same meaning as the preset reminder It is noted that "associated" may include the concept of the same, equivalent, similar.

In one embodiment of the present invention, the server 820 makes segmentation and semantic analysis on the content of the source code to generate semantic analysis results. Then the server 820 compares the preset reminder content to the semantic analysis results and defines the content of the source code corresponding to the part of the semantic analysis results to be reminded, if at least part of the semantic analysis results is associated with the preset reminder content. The server 820 compares the source code with preset reminder content and determines whether they are related and sets the related content as the content to be reminded.

After the server 820 obtains the content to be reminded, it clears the default format of the content to be reminded, a page code control format and sets the content to be reminded using a preset display style. Wherein the default style corresponds to one or more of the default attributes. The preset display style corresponds to one or more preset attribute values.

Specifically, the server 820 obtains from the source code the initial attribute value with one or more of the preset attributes. In other words, the server 820 obtains the initial default style of the content to be reminded, then modifies the initial attribute value with one or more of the preset attributes into preset attribute values and generates the marked web page after the modification.

In one example of the present invention, the preset attributes include one or more of font weight, font color, underline, background color.

When the content to be reminded is a date, the server 820 only marks the dates first appearing in each paragraph or each line in the web page.

In order to avoid the interference caused to the user, when the content to be reminded is a keyword, the browser client of the mobile terminal only marks isolated keywords. Specifically, the browser client of the mobile terminal only marks a special format in which there are no English or Chinese characters before and after.

After the content to be reminded in the web page is marked, the marked page is sent and displayed to the user of the browser client of the mobile terminal. The marked page conspicuously displays the content that concerns a user so that users can more easily find and view the contents they care about.

According to the system for marking and reminding on contents in a web page, the server marks a content which concerns a user before a web page is displayed to the user after loading has finished and the web page is sent to the browser client of the mobile terminal, and marks and displays a new content in a designated format using a special preset style, so that the new content is more conspicuous in a page, and a user can conveniently and rapidly identify the new content when browsing a web page, thereby enhancing the user experience and saving time.

Figure 9:
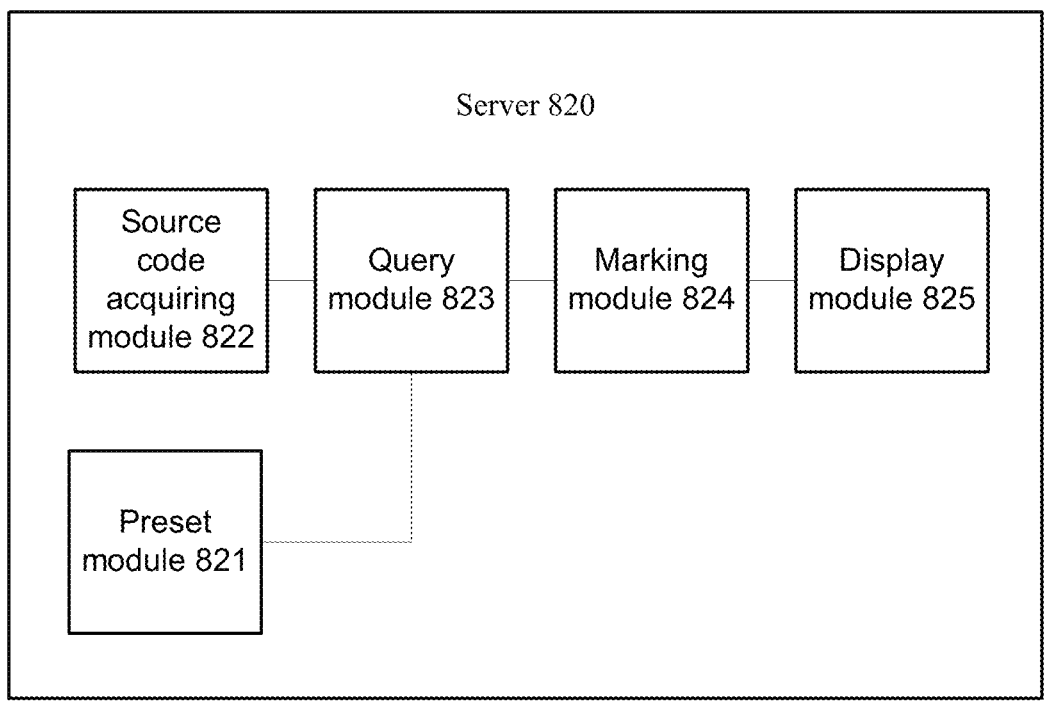
FIG. 9 is a schematic view of a server according to some embodiments.

FIG. 9 describes the server 820 according to some embodiments.

As shown in FIG. 9, the server 820 may include: a preset module 821, a source code and web page acquiring module 822, a query module 823, a marking module 824, and a communications module 825.

The preset module 821 may be configured to preset and store reminder content and a display style.

The preset reminder content is the content in a web page which concerns a user of a browser client of a mobile terminal and can be preset by the user in the browser client of the mobile terminal 810 and sent to the preset module 821.

In the example of the present invention, the preset reminder content can be classified into the preset dates and non-dates. Specifically, the preset reminder content may include the date and/or keywords. Further, the preset reminder content is stored in a predetermined format based on the content type.

Specifically, the date is stored in a designated date format, for example: yyyy-mm-dd, yy-mm-dd or mm-dd. Non-date is stored in a designated keyword format, for example: [latest], [new], [today], [headlines] and so on. The body of the web page contains a date and/or a text, but the content may not be of interest to the user. By the above-described manner to set the date and/or keyword format, thereby avoiding the interference of other non-date and/or keywords in a web page which are of no interest to users.

It should be understood that the above is merely an example of the preset reminder content, and not to limit the present invention. The preset reminder content in the present invention may further include those other than dates and keywords that a user of a browser client of a mobile terminal is concerned about.

The preset module 821 automatically obtains the date of the current system through the interface prompted from the system, and converts the date to all kinds of date strings consistent with the date format in the preset reminder content, and stores converted date strings and keywords.

The user of the browser client of the mobile terminal inputs a desired webpage address in the mobile terminal, and the browser client of the mobile terminal sends a request of accessing the webpage to the server 820 based on the address.

The source code and web page acquiring module 822 responds to the request sent by the browser client of the mobile terminal, obtains the corresponding page and the source code of the web page in html.

In the process of loading web pages, the query module 823 automatically looks up the source code to obtain the content to be reminded semantically associated with preset reminder content. It is noted that "associated" may include the concept of the same, equivalent, similar.

In one embodiment of the present invention, the query module 823 makes segmentation and semantic analysis on the content of the source code to generate semantic analysis results. Then the query module 823 compares the preset reminder content to the semantic analysis results. It defines the content of the source code corresponding to the part of the semantic analysis results to be reminded, if at least part of the semantic analysis results is associated with the preset reminder content.

After the server 824 obtains the content to be reminded, it clears the default format of the content to be reminded, a page code control format and sets the content to be reminded using a preset display style. Wherein the default style corresponds to one or more of the default attributes. The preset display style corresponds to one or more preset attribute values.

Specifically, the marking module 824 obtains from the source code the initial attribute value with one or more of the preset attributes. In other words, the marking module 824 obtains the initial default style of the content to be reminded, then modifies the initial attribute value with one or more of the preset attributes into preset attribute values and generates the marked web page after the modification.

In one example of the present invention, the preset attributes include one or more of font weight, font color, underline, and/or background color.

When the content to be reminded is a date, the marking module 824 only marks the dates first appearing in each paragraph or each line in the web page.

In order to avoid the interference caused to the user, when the content to be reminded is a keyword, the browser client of the mobile terminal only marks isolated keywords. Specifically, the browser client of the mobile terminal only marks a special format in which there are no English or Chinese characters before and after.

After the content to be reminded in the web page is marked, the marking module 824 generates the marked web page and sends it to the browser client of the mobile terminal through the communication module 825. The marked web page conspicuously displays the content that concerns a user so that users can more easily find and view the contents they care about.

According to the server in the present invention, the server marks a content which concerns a user before a web page is displayed to the user after loading has finished, and marks and displays a new content in a designated format using a special preset style, so that the new content is more conspicuous in a page, and a user can conveniently and rapidly identify the new content when browsing a web page, thereby enhancing the user experience and saving time.

Any process or method described in flowcharts or in other manners may be understood to indicate one or more modules, segments, or portions of executable codes that can be used to implement specific logical functions or processes, and the scope of the preferred embodiment of the present invention includes alternative implementations, which may not be in the order as shown or discussed, including based on the involved functionality in a substantially simultaneous manner or in reverse order, to perform functions, which should be understood by people skilled in the art in the embodiments of the present invention.

Logics and/or steps described herein in flowcharts or by other means, for example, may be considered as a given sequence table for implementing the executable instructions of logical functions, may be embodied in any computer-readable medium, providing uses to an instruction execution system, apparatus, or device (e.g., a computer-based system, including a processor system or other systems which can execute instructions from an instruction execution system, apparatus, or device), or a combination of these instruction execution system, apparatus or equipment. For purposes of this specification, the "computer-readable medium" can be any means that can contain, store, communicate, propagate, or transport the program for the instruction execution system, apparatus, or device, or a combination of these instruction execution system, apparatus, or equipment used. More specific computer-readable medium examples (a non exhaustive list) include the following: having one or more wires electrically connecting portion (electronic device), a portable computer diskette cartridge (magnetic means), a random access memory (RAM), a read-only memory (ROM), an erasable programmable read-only memory (EPROM or Flash memory), an optical fiber device, and a portable compact disc read-only memory (CDROM). Additionally, the computer-readable medium could even be paper or another suitable medium upon which the program is printed, because, for example, it is ok to optically scan paper or other medium and then edit, interpret, or if necessary, in other suitable manners electronically process to obtain the program, and then store it in a computer memory.

It should be appreciated that the various parts of the present invention may be implemented in hardware, software, firmware, or combination thereof. In the above embodiments, and a plurality of steps or methods may be implemented in software or firmware stored in the storage memory and executed by the system to perform the appropriate instructions. For example, if implemented in hardware, as in another embodiment, it can be implemented using any of the following techniques or their combinations known in the art: discrete logic circuitry used for implementing logic gates of logic functions in a digital signal, an ASIC having a suitable combination of logic gates circuits, a programmable gate array (PGA), a field programmable gate array (FPGA) and the like.

Ordinary people skilled in the art can understand the implementation of all or part of the steps of the above-described embodiments can be carried by a program instructing relevant hardware, wherein the program may be stored in a computer readable storage medium. When the program is executed, it comprises the steps, or combinations thereof of the method in the embodiment.

Further, in the present invention, various functional units in the embodiments may be integrated in one processing module, or may exist in a separate unit, or may also be two or more units integrated in one module. The above integrated modules can be implemented both in the form of hardware and software functional modules. The integrated modules, if implemented as software functional modules and sold or used as a separate product may be stored in a computer readable storage medium.

The above mentioned storage medium may be a read-only memory, a magnetic or optical disk and the like.

In the description of the present specification, the referenced terms "one embodiment", "some embodiments", "an example", "a specific example", or "some examples" etc., means that a particular feature, structure, material, or characteristic described in the embodiments or examples is included in at least one of the embodiments or examples. In the present specification, the schematic representation of the above term is not necessarily referring to the same embodiment or example. Furthermore, the particular features, structures, materials, or characteristics described may be combined in a suitable manner in any one or more embodiments or examples.

Although the above has illustrated and described the embodiments of the present invention, it is understood that the above-described embodiments are illustrative and are not to be construed as limiting the invention. One of ordinary skill in the art without departing from the principles and spirit of the invention may change, modify, substitute the above described embodiments within the scope of the present invention.

That which is claimed:

1. A method comprising:
   presetting, by a browser client of a mobile terminal, reminder content and a display style, wherein the display style comprises a plurality of preset attribute values, wherein the reminder content comprises a date;
   storing the reminder content and the display style in the mobile terminal;
   acquiring, by the browser client of the mobile terminal, a source code of a web page;
   searching, by the browser client of the mobile terminal, the source code to obtain content to be reminded that is semantically associated with the reminder content, wherein the content to be reminded comprises at least one date appearance; and marking and displaying, by the browser client of the mobile terminal, the content to be reminded using the display style in the web page, wherein marking the content to be reminded using the display style in the web page comprises:

in response to obtaining the content to be reminded, modifying one or more initial attribute values of one or more preset attributes from the content to be reminded into the plurality of preset attribute values of the display style; and generating the web page based on the plurality of preset attribute values of the display style, wherein the content to be reminded comprise a plurality of date appearances, wherein marking and displaying, by the browser client of the mobile terminal, the content to be reminded further comprises marking only a first date appearance of the plurality of date appearances within a portion of the web page, and wherein the first date appearance of the marking is semantically associated with the date of the reminder content.

2. The method of claim 1, wherein searching the source code to obtain the content to be reminded that is semantically associated with the reminder content further includes:

performing segmentation and semantic analysis on the source code to generate semantic analysis results;

comparing the reminder content to the semantic analysis results; and in response to determining that at least one part of the semantic analysis results is semantically similar to the reminder content, determining at least one part of the source code corresponding to the at least one part of the semantic analysis results as the content to be reminded.

3. The method of claim 1, wherein the content to be reminded that is semantically associated with reminder content includes: the same content as the reminder content or the content having the same meaning as the reminder content.

4. The method of claim 1, wherein the reminder content is stored according to types of contents and predetermined formats.

5. The method of claim 1, wherein the reminder content comprises a keyword, wherein the content to be reminded comprises a keyword appearance, wherein marking and displaying, by the browser client of the mobile terminal, further comprises:

in response to determining that the keyword appearance is isolated and not located in a sentence within the web page, marking the keyword appearance.

6. The method of claim 1, wherein the reminder content comprises a keyword, wherein marking the content to be reminded using the display style in the web page further includes:

determining the content to be reminded comprises a keyword appearance; and in response to determining that there is no English or Chinese character before or after the keyword appearance, marking the keyword appearance.

7. The method of claim 1, further comprising:

clearing a default format of the content to be reminded; and setting the content to be reminded using the display style.

8. An apparatus comprising: at least one processor and at least one memory including computer program instructions, the at least one memory and the computer program instructions configured to, with the at least one processor, cause the apparatus to:

preset reminder content and a display style, wherein the display style comprises a plurality of preset attribute values, wherein the reminder content comprises a date;

store the reminder content and the display style in a mobile terminal;

acquire a source code of a web page;

search the source code to obtain content to be reminded that is semantically associated with the reminder content, wherein the content to be reminded comprises at least one date appearance; and mark and display the content to be reminded using a preset display style in the web page, wherein marking the content to be reminded using the display style in the web page comprises:

in response to obtaining the content to be reminded, modifying one or more initial attribute values of one or more preset attributes from the content to be reminded into the plurality of preset attribute values of the display style; and generating the web page based on the plurality of preset attribute values of the preset display style, wherein the content to be reminded comprise a plurality of date appearances, wherein marking and displaying the content to be reminded further comprises marking only a first date appearance of the plurality of date appearances within a portion of the web page, and wherein the first date appearance of the marking is semantically associated with the date of the reminder content.

9. The apparatus of claim 8, wherein the reminder content is set by a user of a browser client of the apparatus.

10. The apparatus of claim 8, wherein the apparatus is further caused to:

perform segmentation and semantic analysis on the source code to generate semantic analysis results;

compare the reminder content to the semantic analysis results; and in response to determining that at least one part of the semantic analysis results is semantically similar to the reminder content, determine at least one part of the source code corresponding to the at least one part of the semantic analysis results as the content to be reminded.

11. The mobile terminal of claim 8, wherein the content to be reminded that is semantically associated with reminder content includes: the same content as the reminder content or the content having the same meaning as the reminder content.

12. The apparatus of claim 8, wherein the reminder content comprises a keyword, wherein marking the content to be reminded using the display style in the web page further includes:

determining the content to be reminded comprises a keyword appearance; and in response to determining that there is no English or Chinese character before or after the keyword appearance, marking the keyword appearance.

13. The apparatus of claim 8, wherein the apparatus is further caused to:

clear a default format of the content to be reminded; and set the content to be reminded using the display style.

14. A method comprising:
presetting, by a server, reminder content and a display style, wherein the display style comprises a plurality of preset attribute values, wherein the reminder content comprises a date;
storing, by the server, the reminder content and the display style;
acquiring, by the server, a source code of a web page;
searching, by the server, the source code to obtain content to be reminded that is semantically associated with the reminder content, wherein the content to be reminded comprises at least one date appearance;
marking, by the server, the content to be reminded using the display style in the web page, wherein marking the content to be reminded using the display style in the web page comprises:
in response to obtaining the content to be reminded, modifying one or more initial attribute values of one or more preset attributes from the content to be reminded into the plurality of preset attribute values of the display style; and
generating a marked web page based on the plurality of preset attribute values of the display style; and
sending the marked web page to a browser client of a mobile terminal,
wherein the content to be reminded comprise a plurality of date appearances,
wherein marking, by the server, the content to be reminded further comprises marking only a first date appearance of the plurality of date appearances within a portion of the web page, and
wherein the first date appearance of the marking is semantically associated with the date of the reminder content.

15. The method of claim 14, wherein searching the source code to obtain content to be reminded semantically associated with a preset reminder content further includes:
performing segmentation and semantic analysis on the source code to generate semantic analysis results;
comparing the reminder content to the semantic analysis results; and
in response to determining that at least one part of the semantic analysis results is semantically similar to the preset reminder content, determining at least one part of the source code corresponding to the at least one part of the semantic analysis results as content to be reminded.

16. A server, comprising: at least one processor and at least one memory including computer program instructions, the at least one memory and the computer program instructions configured to, with the at least one processor, cause the server to:
preset and store reminder content and a display style, wherein the display style comprises a plurality of preset attribute values, wherein the reminder content comprises a date;
acquire a source code of a web page;
search the source code to obtain content to be reminded that is semantically associated with the reminder content, wherein the content to be reminded comprises at least one date appearance;
mark the content to be reminded using the display style in the web page, wherein marking the content to be reminded using the display style in the web page comprises:
in response to obtaining the content to be reminded, modifying one or more initial attribute values of one or more preset attributes from the content to be reminded into the plurality of preset attribute values of the display style; and
generating a marked web page based on the plurality of preset attribute values of the display style; and
sending the marked web page to a browser client of a mobile terminal,
wherein the content to be reminded comprise a plurality of date appearances,
wherein marking the content to be reminded further comprises marking only a first date appearance of the plurality of date appearances within a portion of the web page, and
wherein the first date appearance of the marking is semantically associated with the date of the reminder content.

17. The server of claim 16, wherein the server is configured to:
perform segmentation and semantic analysis on the source code to generate semantic analysis results;
compare the reminder content to the semantic analysis results; and
in response to determining that at least one part of the semantic analysis results is semantically similar to the reminder content, determine at least one part of the source code corresponding to the at least one part of the semantic analysis results as the content to be reminded.

18. A non-transitory computer-readable medium that includes processor-executable program code that, when executed by a processor, configures the processor to:
preset reminder content and a display style, wherein the display style comprises a plurality of preset attribute values, wherein the reminder content comprises a date;
acquire a source code of a web page;
search the source code to obtain content to be reminded that is semantically associated with the reminder content, wherein the content to be reminded comprises at least one date appearance;
mark the content to be reminded using a preset display style in the web page, wherein marking the content to be reminded using the display style in the web page comprises:
in response to obtaining the content to be reminded, modifying one or more initial attribute values of one or more preset attributes from the content to be reminded into the plurality of preset attribute values of the display style; and
generating the web page based on the plurality of preset attribute values of the preset display style,
wherein the content to be reminded comprise a plurality of date appearances,
wherein marking the content to be reminded further comprises marking only a first date appearance of the plurality of date appearances within a portion of the web page, and
wherein the first date appearance of the marking is semantically associated with the date of the reminder content.

19. The non-transitory computer-readable medium of claim 18, wherein the processor-executable program code, when executed by the processor, configures the processor to:
send the web page to a browser client of a mobile terminal.

* * * * *